(12) United States Patent
Tseng

(10) Patent No.: US 12,411,289 B2
(45) Date of Patent: Sep. 9, 2025

(54) LATCH STRUCTURE AND OPTICAL RECEPTACLE THEREOF

(71) Applicant: Chung-Ming Tseng, Myau-Li County (TW)

(72) Inventor: Chung-Ming Tseng, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 0 days.

(21) Appl. No.: 17/144,143

(22) Filed: Jan. 8, 2021

(65) Prior Publication Data

US 2021/0263241 A1 Aug. 26, 2021

Related U.S. Application Data

(60) Provisional application No. 62/981,537, filed on Feb. 26, 2020.

(51) Int. Cl.
*G02B 6/38* (2006.01)

(52) U.S. Cl.
CPC ......... *G02B 6/3825* (2013.01); *G02B 6/3898* (2013.01); *G02B 6/3897* (2013.01)

(58) Field of Classification Search
CPC ... G02B 6/3898; G02B 6/3893; G02B 6/3891
See application file for complete search history.

(56) References Cited

U.S. PATENT DOCUMENTS

| | | | |
|---|---|---|---|
| 2019/0243072 A1* | 8/2019 | Takano | G02B 6/3825 |
| 2019/0377139 A1* | 12/2019 | Chang | G02B 6/3898 |

\* cited by examiner

*Primary Examiner* — Uyen Chau N Le
*Assistant Examiner* — Hoang Q Tran

(57) ABSTRACT

The present invention provides a latch structure arranged in an optical receptacle. The latch structure comprises a supporting element and a first clip structure, wherein the supporting element is assembled with the housing of the optical receptacle. The first clip structure is formed on the supporting element for retaining the optical connector inserting into the optical receptacle. The main idea of the present invention is that when the latch structure assembling with the optical receptacle, there is no interaction force between the first clip structure and optical receptacle so as to maintain the clipping force of the first clip structure acting on the optical connector.

10 Claims, 13 Drawing Sheets

LATCH STRUCTURE AND OPTICAL RECEPTACLE THEREOF

CROSS-REFERENCE TO RELATED APPLICATION

This application claims the benefit under 35 U.S.C. § 119(e) to the U.S. provisional patent application having the Ser. No. 62/981,537 filed on Feb. 26, 2020, the entirety of which is incorporated herein by reference.

FIELD OF INVENTION

The present invention relates to a latch structure. In particular, it relates to a latch structure used for coupling to an optical connector and an optical receptacle thereof.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

The above information disclosed in this section is only for enhancement of understanding of the background of the described technology and therefore it may contain information that does not form the prior art that is already known to a person of ordinary skill in the art.

SUMMARY OF THE INVENTION

The present invention provides a latch structure and an optical receptacle thereof. When latch structure is assembled inside the housing of the optical receptacle, the housing of the optical receptacle and the latch structure are used to clip the optical connector inserted from the opening of the optical receptacle. There is no force generated between the clip structures, so that the pair of clip elements on the clip structure can maintain the same distance, thereby maintaining the clipping effect.

In one embodiment of the present invention, the present invention provides a latch structure, disposed in an optical receptacle, comprising: a supporting element, configured for combining with the optical receptacle; and a first clip structure, formed on the supporting element, and configured for buckling with an optical connector, wherein during combination process of the supporting element and the optical receptacle, there is no interaction force between the optical receptacle and the first clip structure.

In another embodiment of the present invention, the present invention also provides an optical receptacle, comprising: a housing, having an accommodation space, a first assembly structure disposed in the accommodation space of the housing; and a latch structure, disposed in the accommodation space, comprising: a supporting element, configured for combining with the first assembly structure; and a first clip structure, formed on the supporting element, and configured for buckling with an optical connector, wherein during combination process of the supporting element and the first assembly structure, there is no interaction force between the housing and the first clip structure.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1:
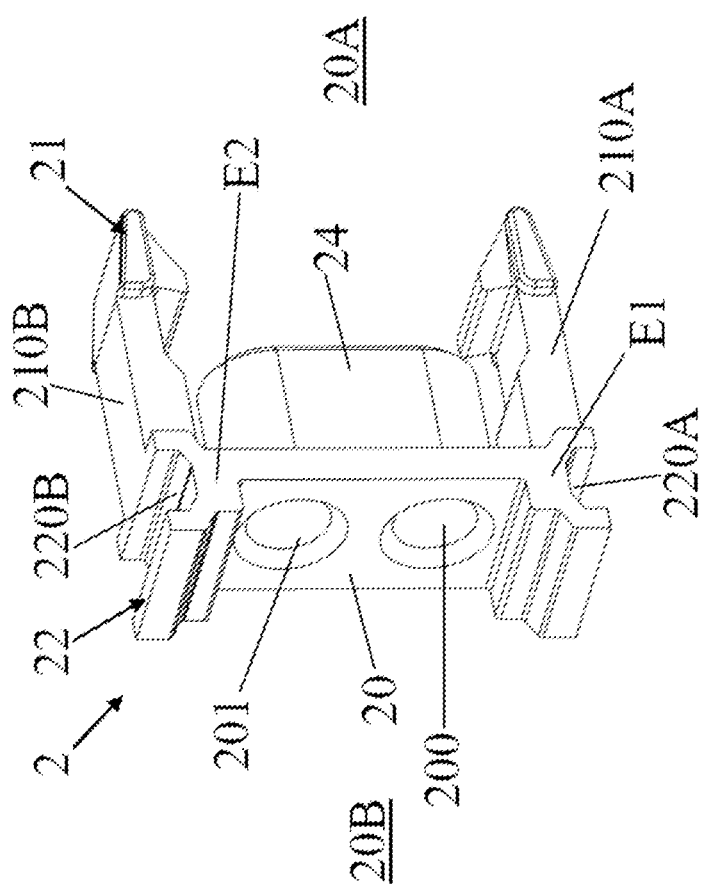
FIG. 1 is a three-dimensional schematic diagram of an embodiment of the latch structure in the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a latch structure and optical receptacle thereof and to aid it of skilled in the art in practicing this invention. These embodiments are merely exemplary embodiments and in no way to be considered to limit the scope of the invention in any manner.

Please refer to FIG. 1, which is a three-dimensional schematic diagram of an embodiment of the latch structure in the present invention. In this embodiment, the latch structure 2 includes a supporting element 20, a first clip structure 21 and a second assembly structure 22. In this embodiment, the supporting element 20, the first clip structure 21, and the second assembly structure 22 are integrally formed, but are not limited thereto. For example: the supporting element 20, the first clip structure 21, and the second assembly structure 22 may also be an independent element, which make up the latch structure 2. The first clip structure 21 further has a first fastener 210A and a second fastener 210B, which are respectively located at the two end portions E1 and E2 of the supporting element 20 and extended toward the first side 20A. In this embodiment, the supporting element 20 has a first through hole 200 and a second through hole 201 on the surface on the second side 20B. The second assembly structure 22 has a first assembly element 220A and a second assembly element 220B, which are respectively disposed on the two end portions E1 and E2 of the supporting element 20. In this embodiment, the first assembly element 220A and the second assembly element 220B are respectively groove structures. The first assembly element 220A is disposed on one side of the first through hole 200 and corresponding to the first fastener 210A, and the second coupling element 220B is disposed on one side of the second through hole 201 and corresponding to the second fastener 210B. In this embodiment, the first side 20A of the supporting element 20 further has a first coupling structure 24 formed between the first fastener 210A and the second fastener 210B. The first coupling structure 24 has a coupling hole communicating with the first through hole 200 and the second through hole 201.

Figure 2:
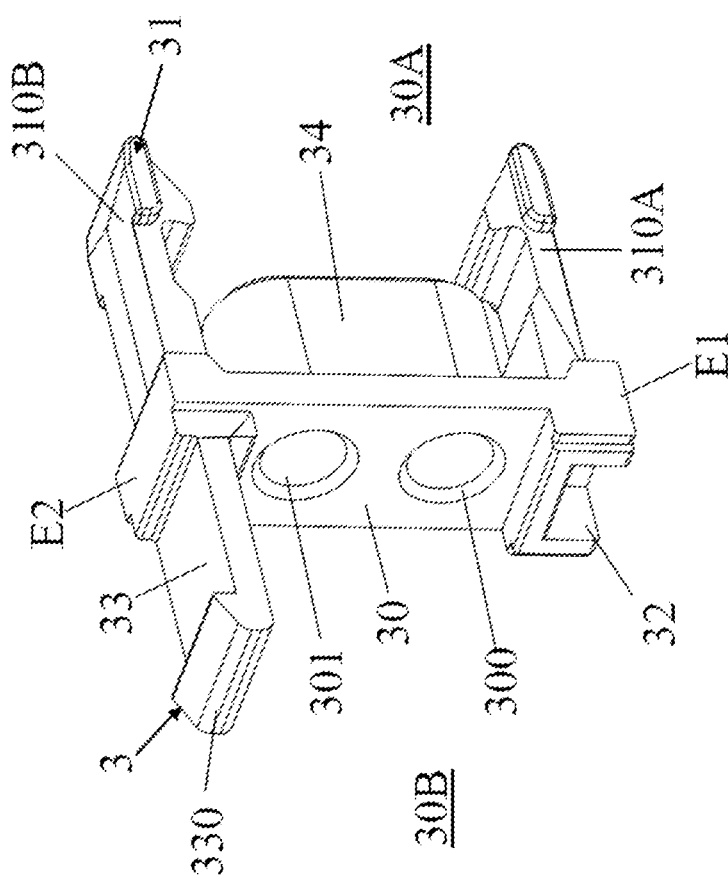
FIG. 2 is a three-dimensional cross-sectional schematic diagram of another embodiment of the latch structure in the present invention.

Please refer to FIG. 2, which is a three-dimensional cross-sectional schematic diagram of another embodiment of the latch structure in the present invention. In this embodiment, the latch structure 3 includes a supporting element 30, a first clip structure 31 and a second assembly structure 32. In this embodiment, the supporting element 30, the first clip structure 31, and the second assembly structure 32 are integrally formed, but not limited thereto. For example: the supporting element 30, the first clip structure 31, and the second assembly structure 32 may also be an independent element, which make up the latch structure 3. In this embodiment, the first clip structure 31 includes a first fastener 310A and a second fastener 310B, which are respectively located at the two end portions E1 and E2 of the supporting element 30 and extended toward the first side 30A. The second assembly structure 32 is disposed on the supporting element 30. In this embodiment, the second assembly structure 32 is disposed on the end portion E1 of the supporting element 30 and corresponds to the first fastener 310A, and the second assembly structure 32 is a groove structure. In this embodiment, the supporting element 30 has a first through hole 300 and a second through hole 301 on the surface on the second side 30B. The second assembly structure 32 is disposed on one side of the first through hole 300. At a position where the surface of the second side 30B of the supporting element 30 is close to the second fastener 310B, there is a third assembly structure 33 extended from the surface of the end portion E2 of the supporting element 30 toward the second side 30B. A hook portion 330 is disposed on the end of the third assembly structure 33 to generate the fixing and positioning effect. In this embodiment, the first side 30A of the supporting element 30 further has a first coupling structure 34 formed between the first fastener 310A and the second fastener 310B. The first coupling structure 34 has a coupling hole communicating with the first through hole 300 and the second through hole 301.

Figure 3:
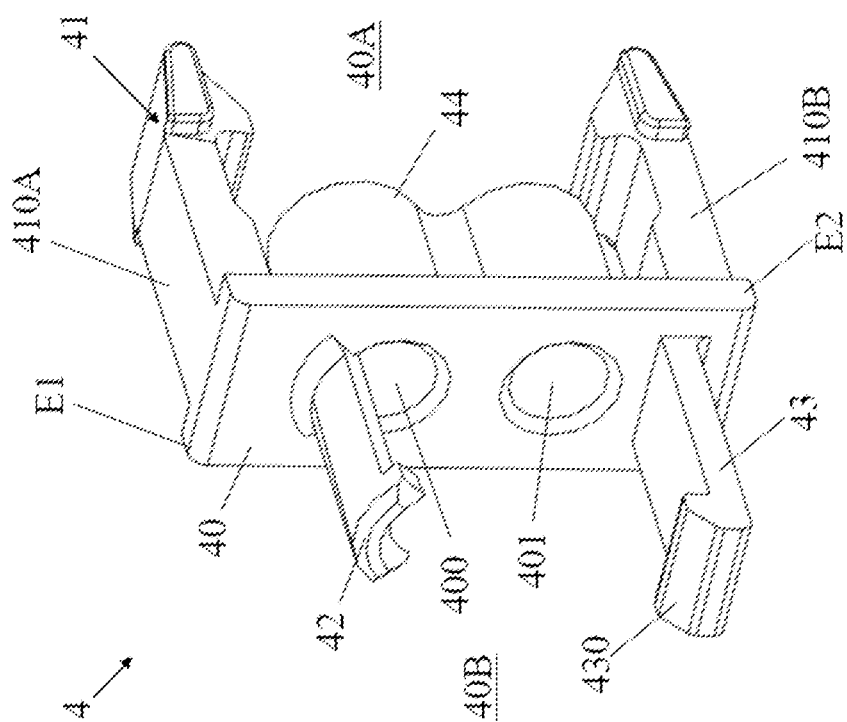
FIG. 3 is a three-dimensional schematic diagram of other embodiment of the latch structure in the present invention.

Please refer to FIG. 3, which is a three-dimensional schematic diagram of other embodiment of the latch structure in the present invention. In this embodiment, the latch structure 4 includes a supporting element 40, a first clip structure 41 and a second assembly structure 42. In this embodiment, the supporting element 40, the first clip structure 41, and the second assembly structure 42 are integrally formed, but it is not limited thereto. For example, in another embodiment, the supporting element 40, the first clip structure 41 and the second assembly structure 42 may also be independent elements, which make up the latch structure 4. The first clip structure 41 is formed on the surface of the supporting element 40 on the first side 40A. In this embodiment, the first clip structure 41 further includes a first fastener 410A and a second fastener 410B respectively located at the two end portions E1 and E2 of the supporting element 40 and extended toward the first side 40A. The second assembly structure 42 is disposed on the surface of the supporting element 40 on the second side 40B. In this embodiment, the second assembly structure 42 extends from the surface of the supporting element 40 toward the second side 40B.

In this embodiment, the second assembly structure 42 is disposed on one side of the first through hole 400. There is a third coupling structure 43 at the end portion E2 of the supporting element 40 extended from the surface of the supporting element 40 toward the second side 40B. A hook portion 430 is disposed on the end of the third assembly structure 43 to generate a fixing and positioning effect. In this embodiment, the supporting element 40 on the first side 40A further has a first coupling structure 44 formed between the first fastener 410A and the second fastener 410B. The first coupling structure 44 has a coupling hole communicating with the first through hole 400 and the second through hole 401. It should be noted that the type of the second assembly structure or the third assembly structure in the foregoing embodiments is not limited, and the main concept is to combine the latch structures 2 to 4 in the optical receptacle. In addition, during the assembling process, the first fasteners 210A, 310A, and 410A and the corresponding second fasteners 210B, 310B, and 410B would not be suffered from any force, and the distance between those two would not be changed.

Figure 4A:
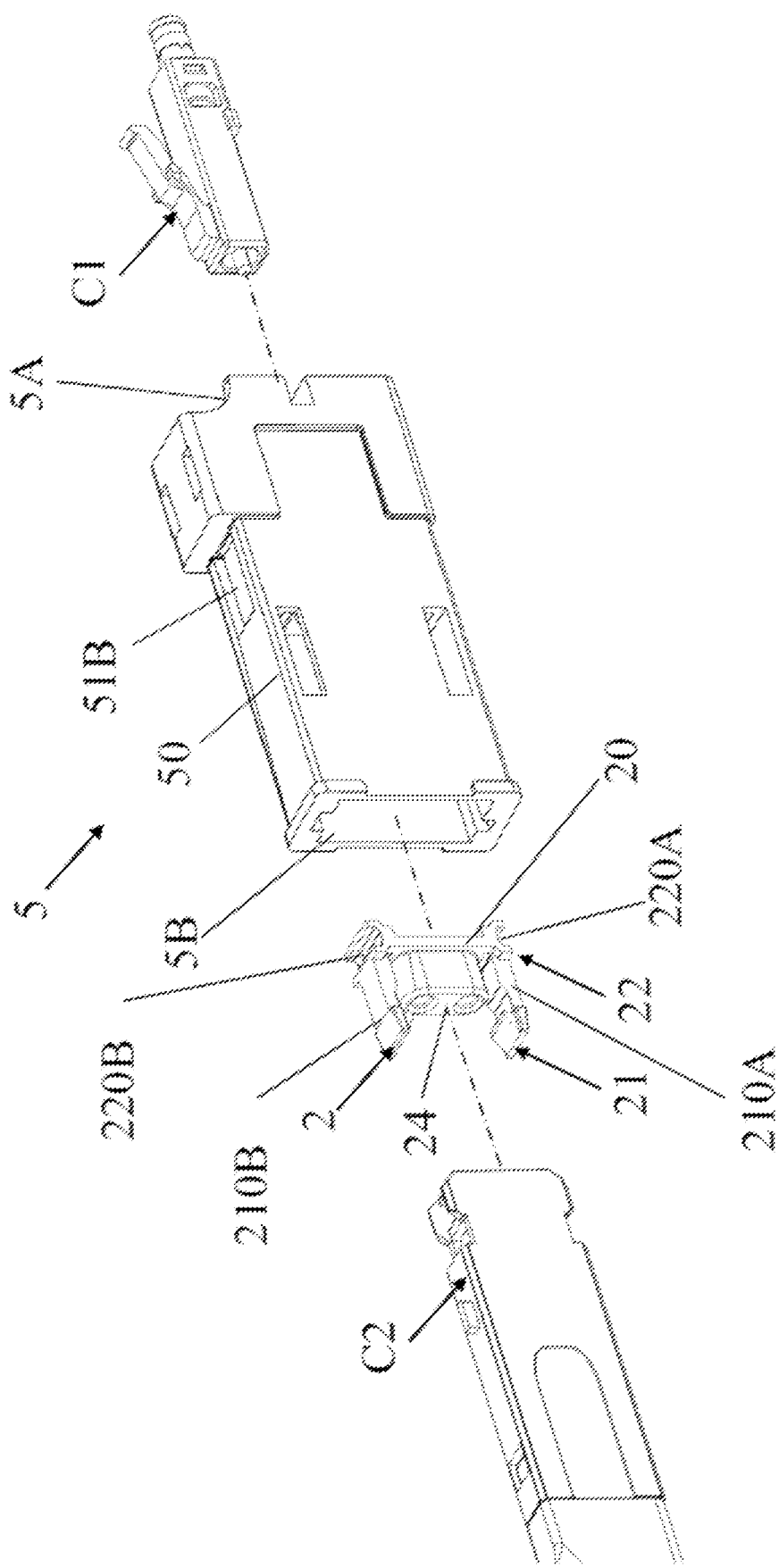
FIG. 4A is a three-dimensional and exploded schematic diagram of an embodiment of the optical receptacle in the present invention.
Figure 4B:
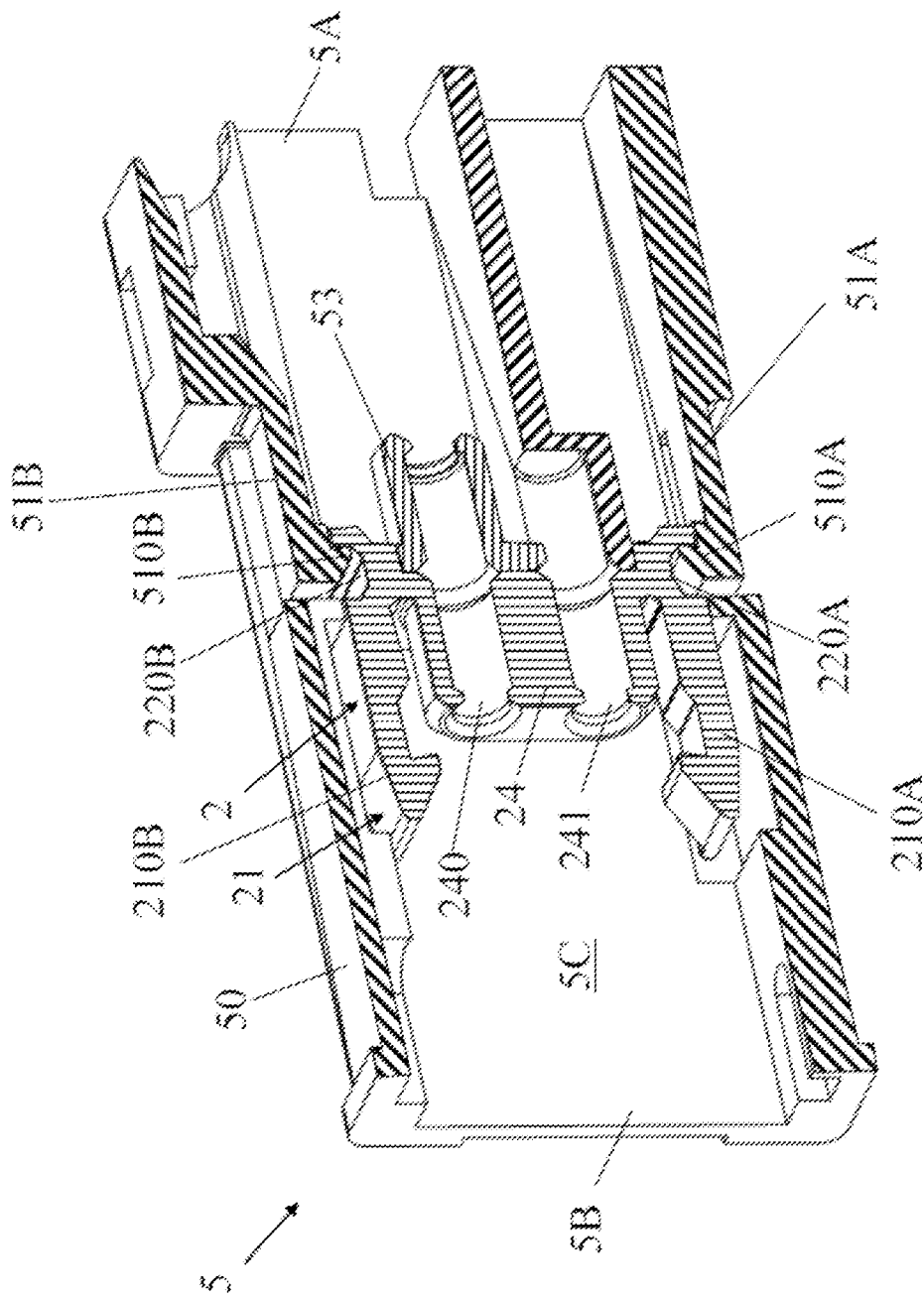
FIG. 4B is a schematic cross-sectional diagram of an embodiment of the optical receptacle in the present invention.

Please refer to FIGS. 4A and 4B, in which FIG. 4A is a three-dimensional and exploded schematic diagram of an embodiment of the optical receptacle in the present invention, and FIG. 4B is a schematic cross-sectional diagram of an embodiment of the optical receptacle in the present invention. The optical receptacle 5 of the present invention is used for accommodating the optical connectors C1 and C2 from the first opening 5A and the second opening 5B on both sides. The optical receptacle 5 includes a housing 50 and a latch structure 2. The housing 50 has an accommodation space 5C. There are first assembly structures 51A and 51B on one of the side walls of the housing 50 in the accommodation space 5C. In this embodiment, the first assembly structures 51A and 51B respectively form the upper side and the lower side of the housing 50, and each first assembly structure 51A and 51B is a flexible cantilever structure with an engaging structure 510A and 510B at those free end. The optical receptacle 5 has a second coupling structure 53 for coupling with the optical connector C1. The second coupling structure 53 is a hollow cylindrical structure and is formed on the side of the first opening 5A of the housing 50.

In this embodiment, the latch structure 2 is the same as that in FIG. 1. In this embodiment, the latch structure 2 is disposed in the accommodation space 5C from the second opening 5B of the optical receptacle 5, and is buckled with the first coupling structures 51A and 51B. In this embodiment, the first assembly element 220A of the second assembly structure 22 on the supporting element 20 of the latch structure 2 is coupled with the first assembly structure 51A in the optical receptacle 5. The second coupling element 220B disposed at another end of the supporting element 20 is coupled with the first assembly structure 51B in the optical receptacle 5. The first assembly element 220A and the second assembly element 220B of this embodiment are grooved structures, and the engaging structures 510A and 510B at the ends of the first assembly structures 51A and 51B are hook structures, so that the engaging structures 510A and 510B can be snapped into the grooves of the second assembly elements 220A and 220B. In addition, the first coupling structure 24 between the first fastener 210A and the second fastener 210B of the latch structure 2 is used to electrically connect to the optical connector C2 inserted into the optical receptacle 5 from the second opening 5B. The first coupling structure 24 has through holes 240 and 241 for allowing the optical fiber terminal at the end of the optical connector C2 to pass through. It is related to the prior art and would not be repeated herein.

Next, the main concept of FIGS. 1 and 4A and 4B in the present invention is going be explained. In the embodiment of the present invention, when the latch structure 2 is installed in the optical receptacle 5, the first fastener 210A and the second fastener 210B of the first clip structure 21 is not suffered from the interaction force of the housing of the optical receptacle 5, and the buckle method is through the combination of the first assembly structure 51A and the first assembly element 220A and the combination of the first assembly structure 51B and the second assembly element 220B, it enables the latch structure 2 to be firmly fixed into the optical connector 5. When the latch structure 2 is installed in the optical receptacle 5, this embodiment may prevent the first fastener 210A and the second fastener 210B of the first clip structure 21 from squeezing by the internal housing of the optical receptacle 5, which causes stress or deformation, so that the distance between the first fastener 210A and the second fastener 210B is not changed, thereby not affecting the clipping and fixing effect of the first fastener 210A and the second fastener 210B for clipping the inserted optical connector C2 from the second opening 5B.

Figure 5A:
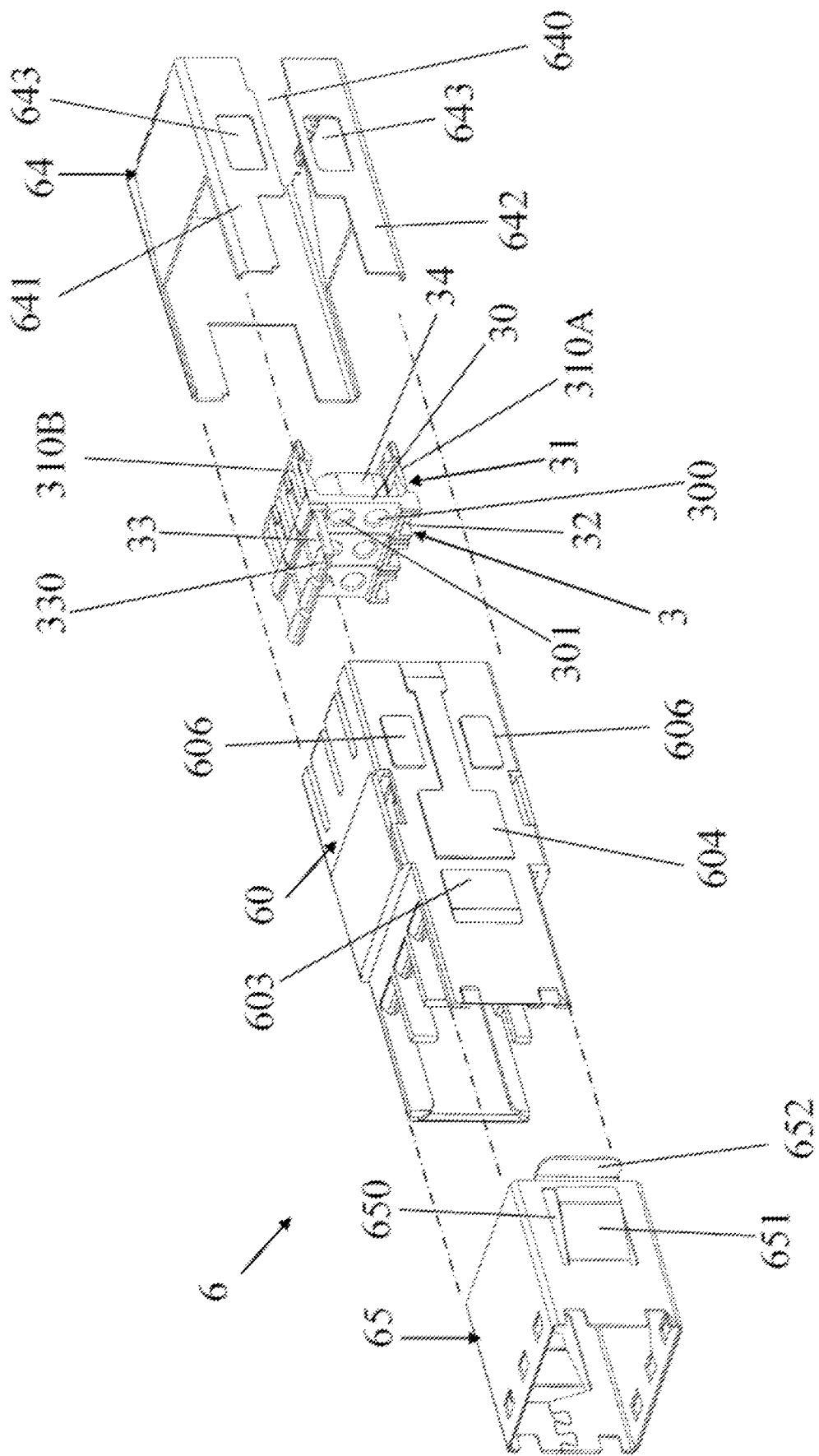
FIG. 5A is a three-dimensional assembly diagram of an embodiment of the optical receptacle in the present invention.
Figure 5B:
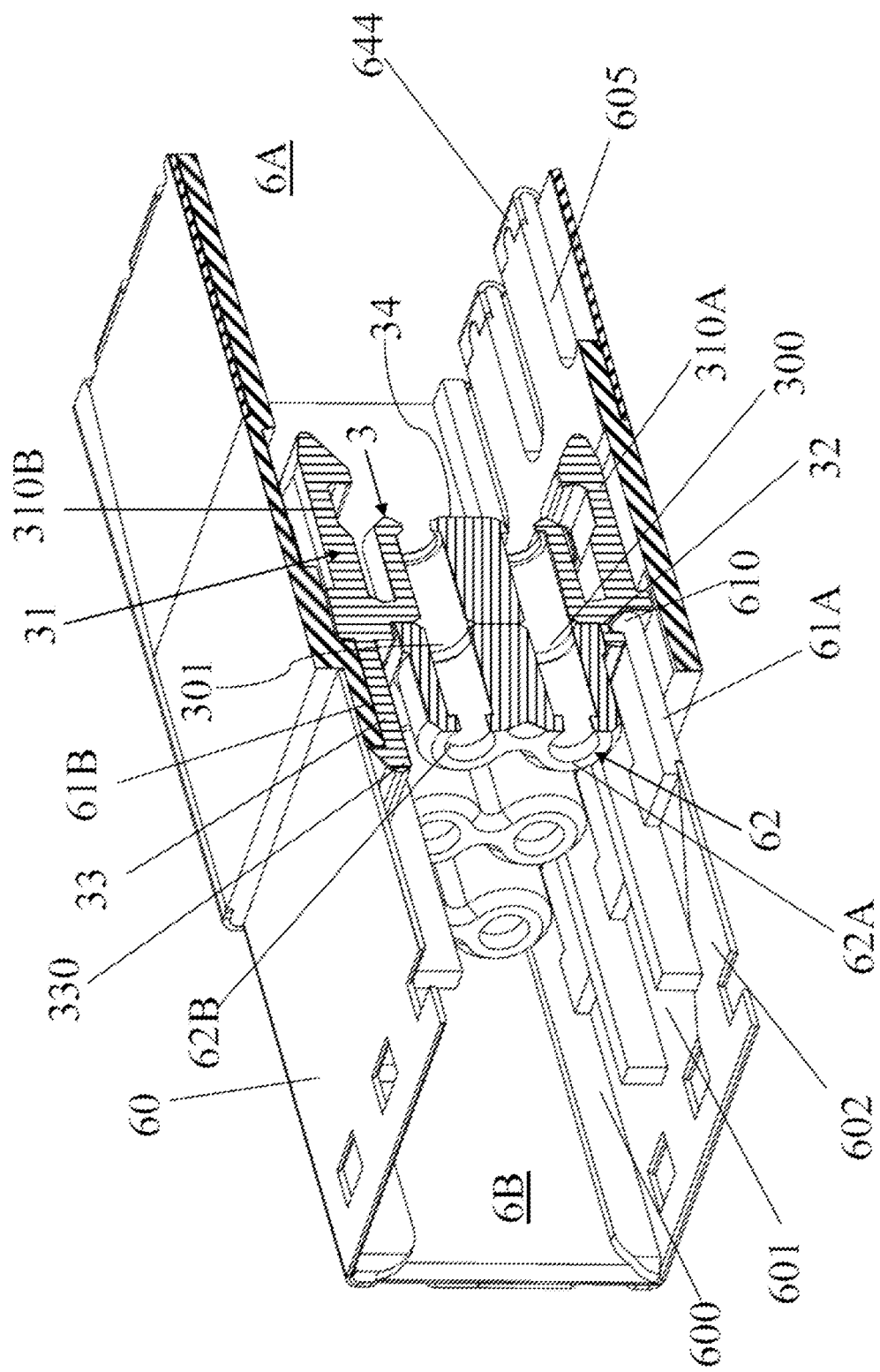
FIG. 5B is a schematic cross-sectional diagram of the combination of the housing and the latch structure of an embodiment of the optical receptacle in the present invention.

Please refer to FIGS. 5A and 5B, in which FIG. 5A is a three-dimensional assembly diagram of an embodiment of the optical receptacle in the present invention, and FIG. 5B is a schematic cross-sectional diagram of the combination of the housing and the latch structure of an embodiment of the optical receptacle in the present invention. The optical receptacle 6 of the present invention is used to allow optical connectors (not shown) to be inserted from the first opening 6A and the second opening 6B on both sides, and the second coupling structure 62 in the optical receptacle 6 and the first coupling structure 34 of the latch structure 3 enable the optical connectors inserted from the first opening 6A and the second opening 6B to be electrically coupled to each other.

The optical receptacle 6 includes a housing 60 and a latch structure 3 installed in the housing 60. The side wall in the housing 60 has a first assembly structure 61A and a fourth assembly structure 61B that are combined with the latch structure 3. In this embodiment, the first assembly structure 61A is a cantilever structure with a snap 610 at its end. The fourth assembly structure 61B is a convex structure. It should be noted that the types of the first assembly structure 61A and the fourth assembly structure 61B are not limited thereto. For example: in another embodiment, the first assembly structure 61A may be a convex structure, and the fourth assembly structure 61B may be a cantilever structure. Alternatively, the first assembly structure 61A may also be a cantilever structure, and the fourth assembly structure 61B is a trench structure, etc., which may be changed by those skilled in the art.

In this embodiment, the second coupling structure 62 in the optical receptacle 6 is used for coupling with the optical connector. The second coupling structure 62 has a first hollow cylindrical structure 62A and a second hollow cylindrical structure 62B, which are used to couple with the optical fiber terminal of the optical connector. In this embodiment, the housing 60 has a plurality of slots 600~602, and each slot 600~602 corresponds to the second coupling structure 62, and each slot 600~602 may allow the optical connector for insertion. The number of slots is determined according to needs, and is not limited herein.

In addition, there is at least one first positioning structure 606 on the outer surface of the first opening 6A of the housing 60. The outer surface of the housing 60 is covered with a first cover housing 64 which has at least one second positioning structure 643 corresponding to the first positioning structure 606 respectively. When the first cover housing 64 is combined with the outer surface of the first opening 6A of the housing 60, each second positioning structure 643 is combined with the corresponding first positioning structure 606. In this embodiment, the first cover housing 64 is a metal structure, and a notch 640 is disposed on one side wall of the first cover housing 64, so that the side walls form an upper lateral plate 641 and a lower lateral plate 642, and the upper lateral plate 641 and lower lateral plate 642 respectively have a second positioning structure 643. In this embodiment, the second positioning structure 643 is an opening structure, and the first positioning structure 606 is a corresponding convex structure that may be embedded in the opening structure. The position that the housing 60 corresponding to the notch 640 is an assembly block 604 for combining with the notch 640 so that the first cover housing 64 may be fixed on the housing 60. In addition, there are a plurality of convex plate body 605 on one side of the first opening 6A, and the first cover housing 64 has a covering member 644, which corresponds to each convex plate body 605 and is connected to the end of the convex plate body 605.

At least one third positioning structure 603 is disposed on the outer surface of the housing 60 at the second opening 6B. The second cover housing 65 has at least one fourth positioning structure 650 corresponding to the third positioning structure 603 respectively. When the second cover housing 65 is combined with the outer surface of the housing 60 at the second opening 6B, each fourth positioning structure 650 is combined with the corresponding third positioning structure 603. In this embodiment, the second cover housing 65 is a metal structure, and a fourth positioning structure 650 is formed on both side walls thereof. In this embodiment, the fourth positioning structure 650 is an opening structure, and the third positioning structure 603 is a corresponding convex structure that may be embedded in the opening structure. In addition, a first stopper 651 is formed on one side of the fourth positioning structure 650 in this embodiment, and a second stopper 652 is formed on an open end of the second cover housing 65. The usage of the first stopper 651 and the second stopper 652 is that when the entire optical receptacle 6 is inserted into a shell of an apparatus, the first stopper 651 and the second stopper 652 can be positioned on the front and rear sides of the shell, and generate the fixing effect.

Next, the method of installing the latch structure 3 into the housing 60 is going to be explained. In this embodiment, the second assembly structure 32 on one end of the supporting element 30 is a groove structure. Therefore, when the latch structure 3 is inserted into the housing 60 through the first opening 6A, it may be buckled with the snap 610 of the first assembly structure 61A in the housing 60. The third assembly structure 33 at another end of the supporting element 30 is coupled with the fourth assembly structure 61B in the housing 60. One end of the third assembly structure 33 in this embodiment is a hook portion 330, when the latch structure 3 is installed, the hook portion 330 and the fourth assembly structure 61B would be clipped together. By the combination of the first assembly structure 61A and the second assembly structure 32 and the combination of the third assembly structure 33 and the fourth assembly structure 61B, the latch structure 3 may be firmly fixed in the housing 60. After the latch structure 3 is assembled into the housing 60, the first coupling structure 34 on the latch structure 3 corresponds to the second coupling structure 62 in the second opening 6B of the housing 60. The first through hole 300 and the second through hole 301 on one side of the first coupling structure 34 correspond to the through holes in the first hollow cylindrical structure 62A and the second hollow cylindrical structure 62B of the second coupling structure 62. Therefore, the optical connectors inserted from the first opening 6A and the second opening 6B may be coupled to each other by the first coupling structure 34 and second coupling structure 62.

The latch structure 3 is inserted into the housing 60 from the first opening 6A by the combination of the first assembly structure 61A and the second assembly structure 32 on the support element 30, and by the combination of the fourth assembly structure 61B and the third assembly structure 33 on the supporting element 30. Therefore, when the latch structure 3 is installed into the optical receptacle 6, the first fastener 310A and the second fastener 310B of the first clip structure 31 would not be suffered from the interaction force of the housing of the optical receptacle 6. In this way, not only the latch structure 3 may be firmly assembled in the housing 60, but also when the latch structure 3 is installed into the optical receptacle 6, the first fastener 310A and the second fastener 310B of the first clip structure 31 is prevented from squeezing by the housing of the optical receptacle 6, which causes stress or deformation, so that the distance between the first fastener 310A and the second fastener 310B is not changed, thereby not affecting the clipping and fixing effect of the first fastener 310A and the second fastener 310B for clipping the inserted optical connector from the opening 6A.

Figure 6A:
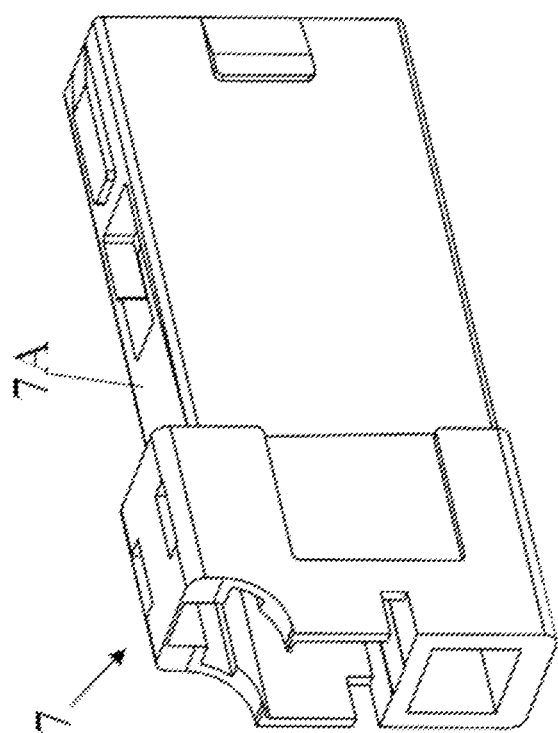
FIG. 6A is a three-dimensional schematic diagram of another embodiment of the optical receptacle in the present invention.
Figure 6B:
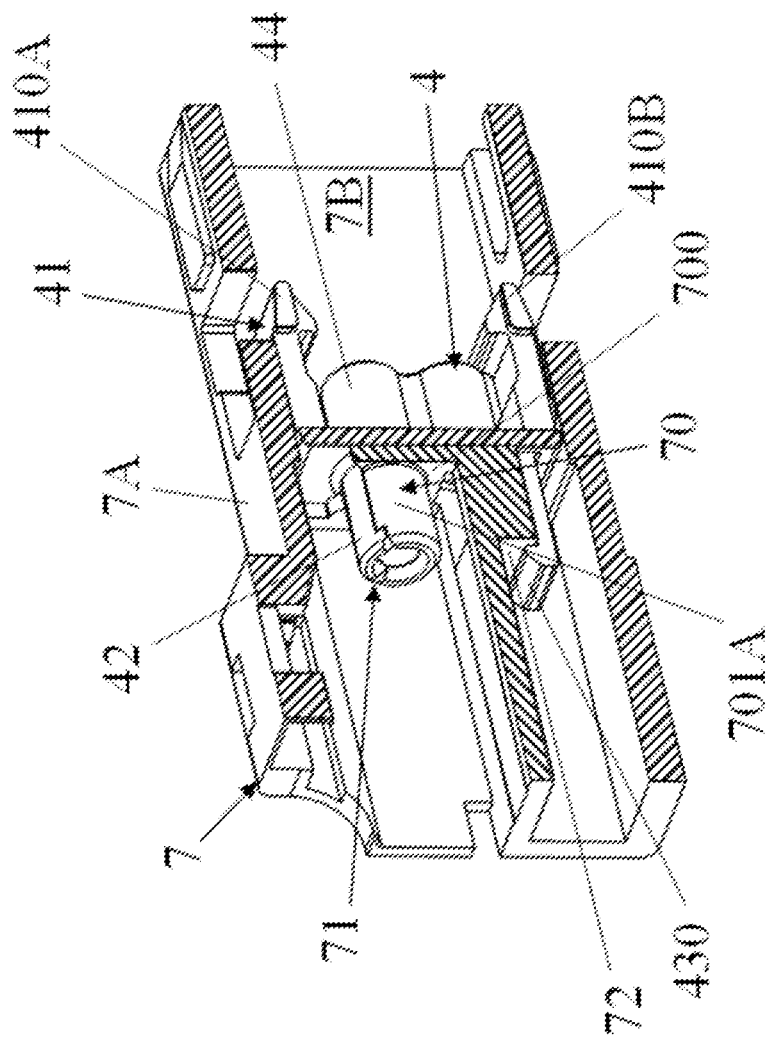
FIG. 6B is a schematic cross-sectional diagram of another embodiment of the optical receptacle in the present invention.
Figure 6C:
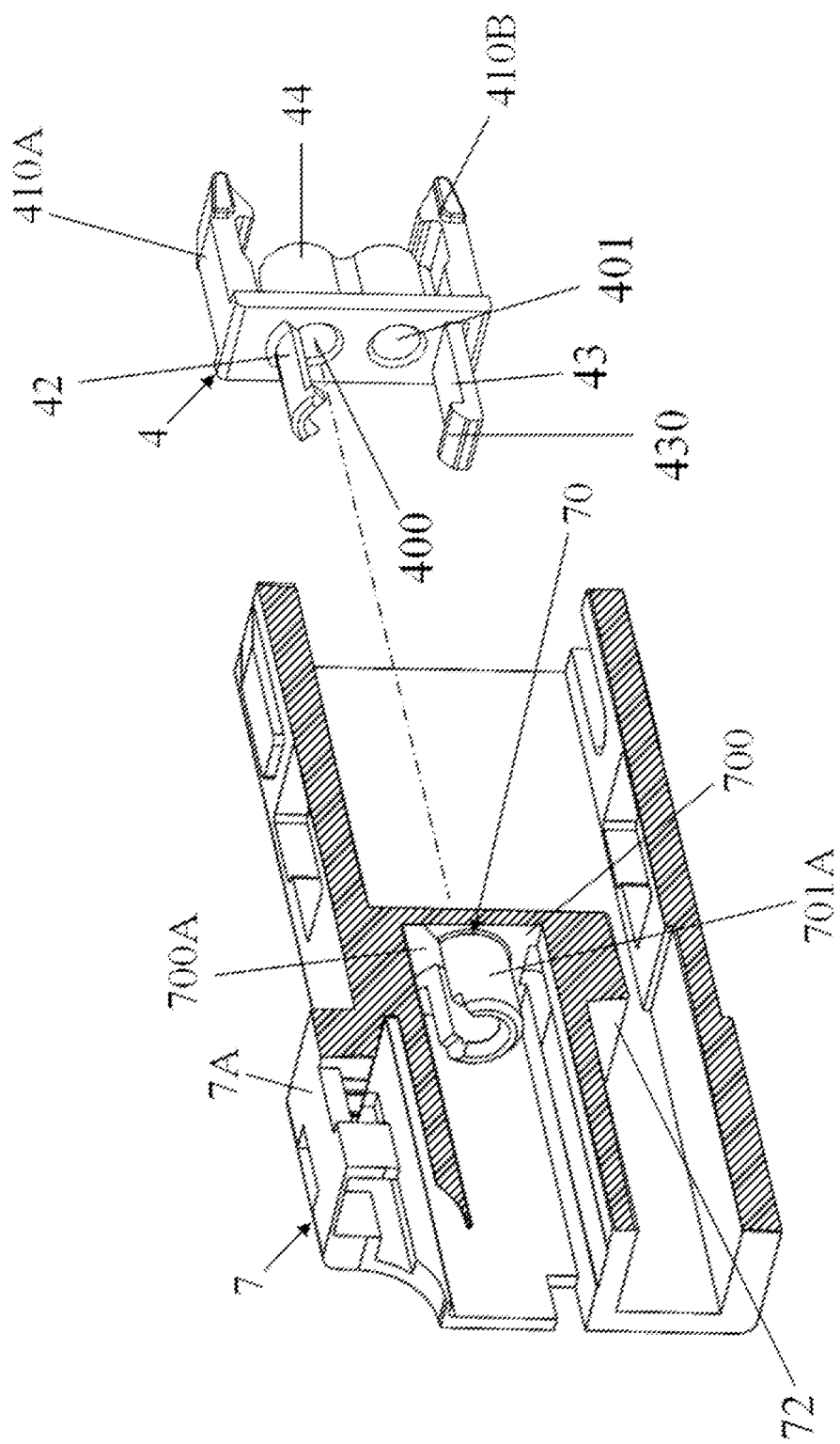
FIG. 6C is an exploded schematic diagram of the housing section and the latch structure of another embodiment of the optical receptacle in the present invention.

Please refer to FIGS. 6A to 6C, in which FIG. 6A is a three-dimensional schematic diagram of another embodiment of the optical receptacle in the present invention, FIG. 6B is a schematic cross-sectional diagram of another embodiment of the optical receptacle in the present invention, and FIG. 6C is an exploded schematic diagram of the housing section and the latch structure of another embodiment of the optical receptacle in the present invention. The optical receptacle 7 of this embodiment has a housing 7A and a latch structure 4 as shown in FIG. 3. The housing 7A has an accommodation space 7B, and a first assembly structure 70 is disposed on one of the side walls of the housing 7A in the accommodation space 7B. In this embodiment, the first assembly structure 70 has a supporting plate 700 and an assembly element 701A. The supporting plate 700 has a first notch 700A communicating with the groove inside the assembly element 701A.

Through the combination of the second assembly structure 42 and the first assembly structure 70, and the combination of the hook portion 430 of the third assembly structure 43 and the fourth assembly structure 72 of the optical receptacle 7, the latch structure 4 may be firmly disposed in the optical receptacle 7. In this embodiment, the second assembly structure 42 passes through the first notch 700A and then is combined with the assembly element 701A to form a hollow cylindrical structure as the second coupling structure 71 coupled to the optical connector. After the latch structure 4 is combined with the first assembly structure 70, the supporting plate 700 is leaned against the supporting element 40.

Next, the main concept of FIGS. 6A to 6C is going be explained. In the embodiment of the present invention, when the latch structure 4 is installed in the optical receptacle 7, the first fastener 410A and the second fastener 410B of the first clip structure 41 is not suffered from the interaction force of the housing of the optical receptacle 7, and the buckle method is through the interaction force between the first assembly structure 70 and the second assembly structure 42, and the interaction force between the hook portion 430 and the fourth assembly structure 72 in the optical receptacle 7. It enables the latch structure 4 to be firmly arranged in the housing 7A. Through this way, not only the latch structure 4 may be firmly assembled in the housing 7A, but also when the latch structure 4 is installed into the optical receptacle 7, the first fastener 410A and the second fastener 410B of the first clip structure 41 is prevented from squeezing by the housing of the optical receptacle 7, which causes stress or deformation, so that the distance between the first fastener 410A and the second fastener 410B is not changed, thereby not affecting the clipping and fixing effect of the first fastener 410A and the second fastener 410B for clipping the inserted optical connector.

Figure 7A:
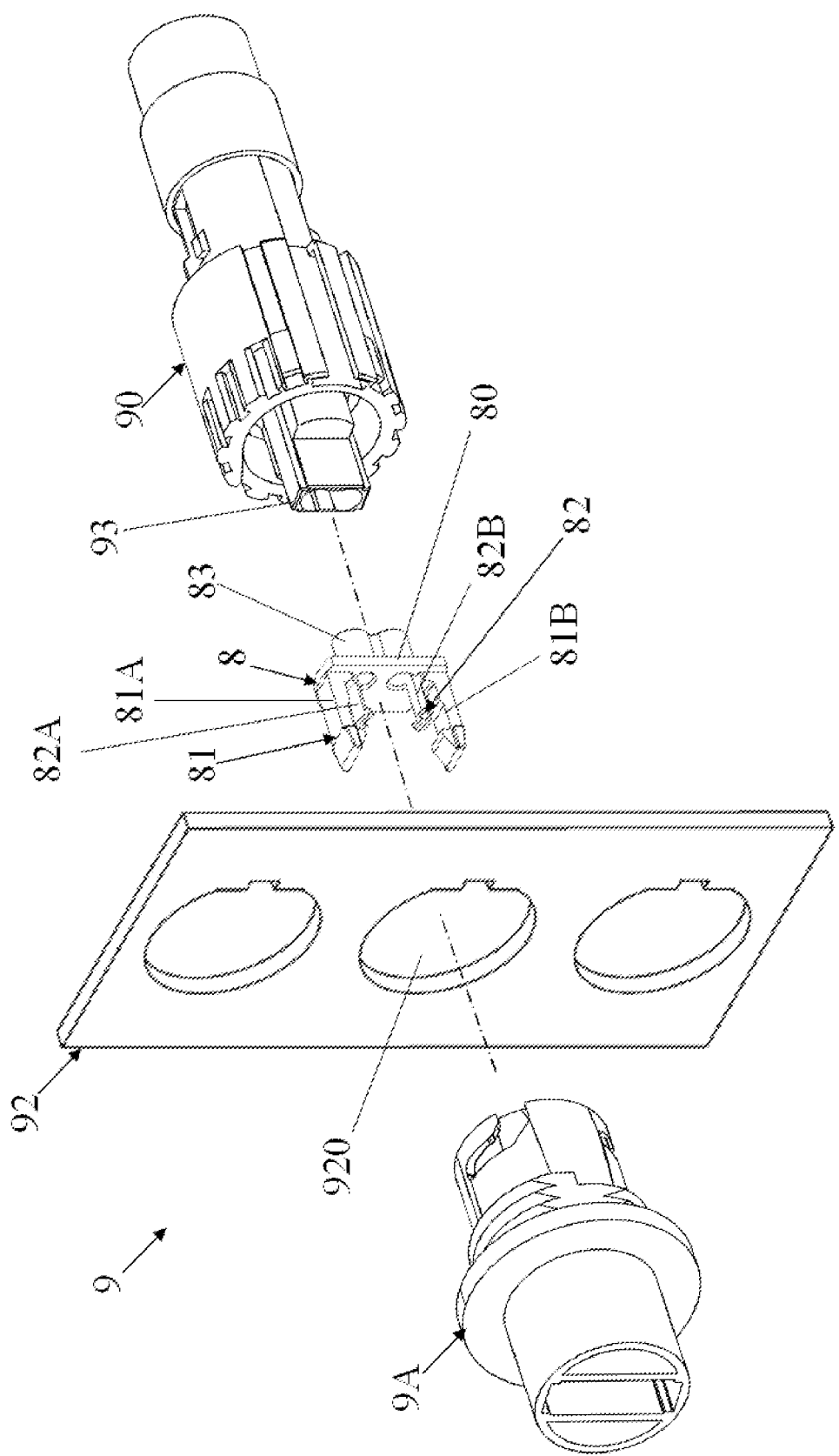
FIG. 7A is a three-dimensional and exploded schematic diagram of another embodiment of the optical receptacle and optical connector in the present invention.
Figure 7B:
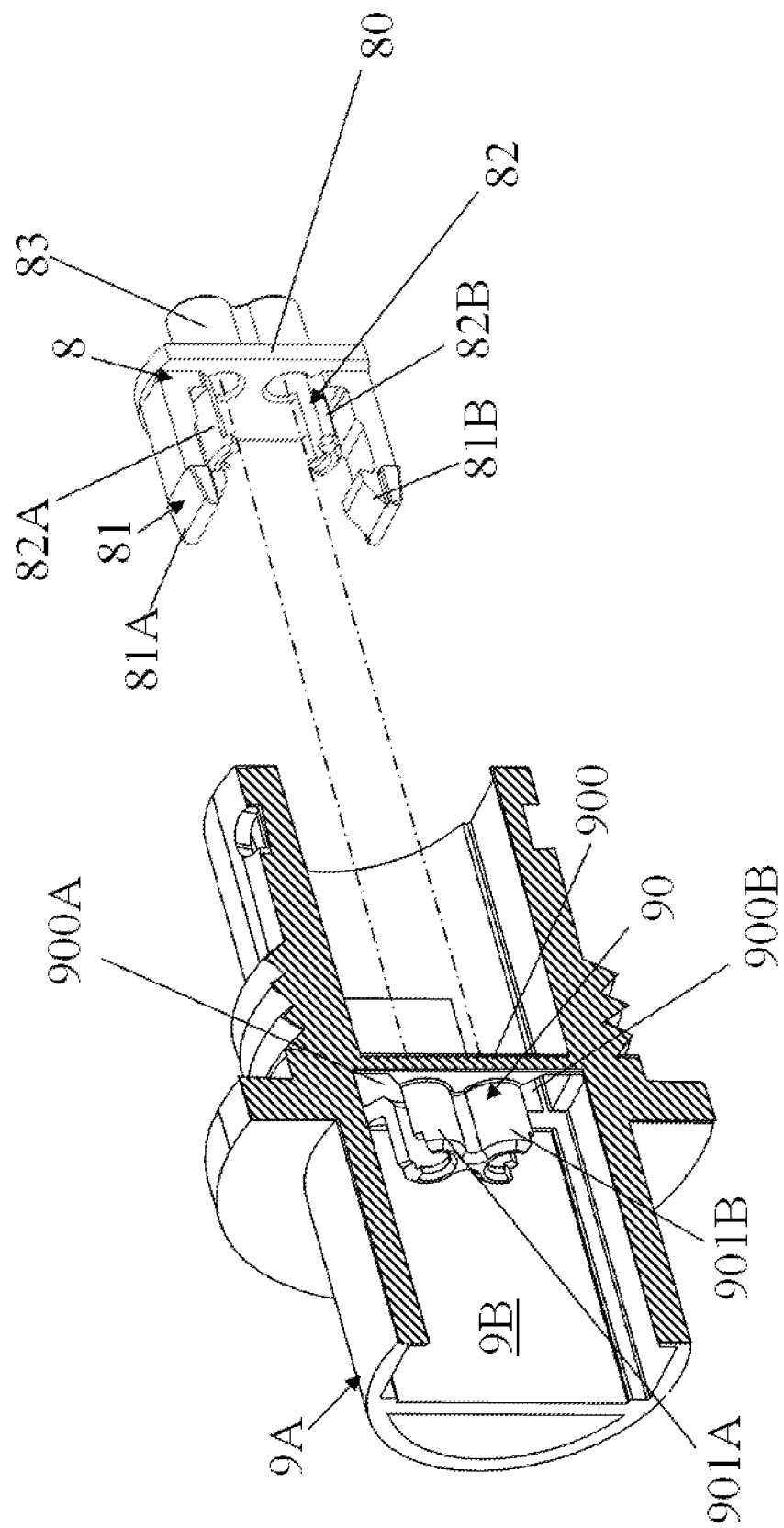
FIG. 7B is a schematic cross-sectional diagram of another embodiment of the optical receptacle shown in FIG. 7A.
Figure 7C:
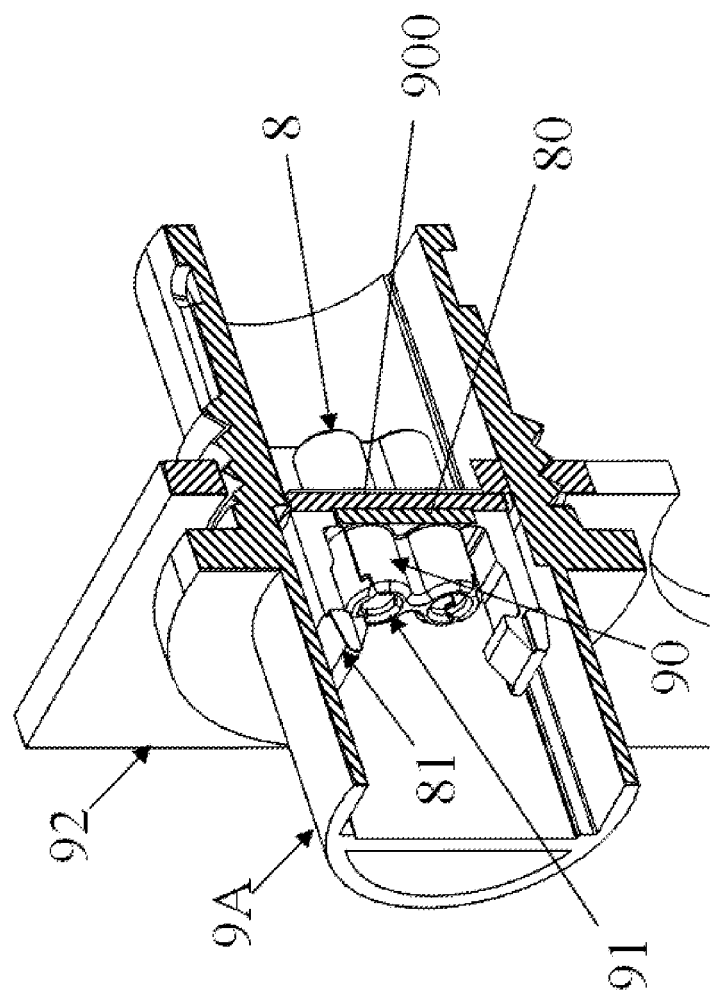
FIG. 7C is an exploded schematic diagram of the housing section and the latch structure of another embodiment of the optical receptacle in the present invention.

Please refer to FIGS. 7A to 7C, in which FIG. 7A is a three-dimensional and exploded schematic diagram of another embodiment of the optical receptacle and optical connector in the present invention, FIG. 7B is a schematic cross-sectional diagram of another embodiment of the optical receptacle shown in FIG. 7A, and FIG. 7C is an exploded schematic diagram of the housing section and the latch structure of another embodiment of the optical receptacle in the present invention. The optical receptacle 9 of this embodiment has a housing 9A and a latch structure 8. The housing 9A has an accommodation space 9B, and a first assembly structure 90 is disposed on one of the side walls of the housing 9A in the accommodation space 9B. In this embodiment, the first assembly structure 90 has a supporting plate 900 and assembly elements 901A and 901B. The supporting plate 900 has notches 900A and 900B, which respectively communicate with the grooves inside the assembly elements 901A and 901B.

Through the combination of the second assembly structure 82 and the first assembly structure 90, the latch structure 8 may be firmly disposed in the housing 9A. In this embodiment, the second assembly structure 82 has a first assembly element 82A and a second assembly element 82B, which respectively pass through the notches 900A and 900B, and then are combined with the assembly elements 901A and 901B to form a hollow cylindrical structure as the second coupling structure 91 coupled to the optical connector. After the latch structure 8 is combined with the first assembly structure 90, the supporting plate 900 is leaned against the supporting element 80. In this embodiment, the housing 9A is installed in the opening hole 920 on the fixing plate 92. The latch structure 8 further has a first coupling structure 83, which is formed on another side of the supporting element 80 between the first fastener 81A and the second fastener 81B of the first clip structure 81, that is, on the side opposite to the second assembly structure 82, and the first coupling structure 83 is used for coupling with a coupling head 93 of the optical connector 90.

Next, the main concept of FIGS. 7A to 7C is going be explained. In the embodiment of the present invention, when the latch structure 8 is installed in housing 9A of the optical receptacle 9, the first fastener 81A and the second fastener 81B of the first clip structure 81 is not suffered from the interaction force from the inner wall or the inner structure of the housing 9A. When the latch structure 8 is installed into the housing 9A, by the interaction force between the first assembly structure 90 and the second assembly structure 82, the latch structure 8 is firmly combined with the first assembly structure 90. During the assembly process, the first fastener 81A and the second fastener 81B of the first clip structure 81 is prevented from squeezing by the housing 9A, which causes stress or deformation, so that the distance between the first fastener 81A and the second fastener 81B is not changed, thereby maintaining the clipping and fixing effect of the first fastener 81A and the second fastener 81B for clipping the inserted optical connector.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. A latch structure, disposed in an optical receptacle, comprising:
    a supporting element, having a plurality of through holes, a first side, and a second side opposite to the first side, and configured for combining with the optical receptacle;
    a first clip structure, formed on the supporting element and extended toward the first side, and configured for buckling with an optical connector;
    a second assembly structure, disposed on the supporting element and extended toward the second side, separated by a first predetermined distance from an end of the supporting element, and disposed between the plurality of through holes and the end of the supporting element; and
    a third assembly structure, disposed on the supporting element and extended toward the second side, separated by a second predetermined distance from another end of the supporting element, and disposed between the plurality of through holes and the another end of the supporting element.

2. The latch structure of claim 1, wherein a first coupling structure is disposed between the first clip structures for electrically connecting with the optical connector.

3. The latch structure of claim 1, wherein the first clip structure has a first fastener and a second fastener, and a first coupling structure is disposed between the first fastener and the second fastener for electrically connecting with the optical connector.

4. An optical receptacle, comprising:
    a housing, having an accommodation space, a first assembly structure disposed into the accommodation space of the housing; and
    a latch structure, disposed in the accommodation space, comprising:
        a supporting element, having a plurality of through holes, a first side, and a second side opposite to the first side, and combining with the optical receptacle;
        a first clip structure, formed on the supporting element and extended toward the first side, and configured for buckling with an optical connector;
        a second assembly structure, disposed on the supporting element and extended toward the second side, separated by a first predetermined distance from an end of the supporting element, and disposed between the plurality of through holes and the end of the supporting element; and
        a third assembly structure, disposed on the supporting element and extended toward the second side, separated by a second predetermined distance from another end of the supporting element, and disposed between the plurality of through holes and the another end of the supporting element.

5. The optical receptacle of claim 4, wherein a first coupling structure is disposed between the first clip structures for electrically connecting with the optical connector.

6. The optical receptacle of claim 4, wherein a first coupling structure is disposed between the first clip structures, and a second coupling structure corresponding to the first coupling structure is disposed in the housing.

7. The optical receptacle of claim 4, comprising a first cover housing which is combined with a first side of the housing, a lateral plate of the first cover housing has a notch for dividing the lateral plate into a first sub-lateral plate and a second sub-lateral plate, which are not connected.

8. The optical receptacle of claim 7, wherein at least one first positioning structure is disposed on a side of a first opening of the housing, the first cover housing has at least one second positioning structure corresponding to the at least one first positioning structure, and the each second positioning structure is combined with the corresponding first positioning structure when the first cover housing is combined with the housing.

9. The optical receptacle of claim 4, comprising a second cover housing, which is combined with a second side of the housing.

10. The optical receptacle of claim 4, wherein the first clip structure has a first fastener and a second fastener, and a first coupling structure is disposed between the first fastener and the second fastener for electrically connecting with the optical connector.

\* \* \* \* \*